(12) United States Patent
Tseng et al.

(10) Patent No.: US 8,130,444 B2
(45) Date of Patent: Mar. 6, 2012

(54) CATADIOPTRIC TELESCOPE IMAGING SYSTEM

(75) Inventors: Shih-Feng Tseng, Taipei (TW); Yu-Jen Lin, Taipei (TW); Kuo-Cheng Huang, Taipei (TW); Wen-Hong Wu, Taipei (TW); Feng-Chang Hsu, Taipei (TW)

(73) Assignee: National Applied Research Laboratories, Taipei (TW)

( * ) Notice: Subject to any disclaimer, the term of this patent is extended or adjusted under 35 U.S.C. 154(b) by 831 days.

(21) Appl. No.: 11/772,473

(22) Filed: Jul. 2, 2007

(65) Prior Publication Data

US 2008/0100912 A1 May 1, 2008

(30) Foreign Application Priority Data

Oct. 26, 2006 (TW) .............................. 95139617 A

(51) Int. Cl.
*G02B 17/08* (2006.01)

(52) U.S. Cl. ....................................... 359/364; 359/379
(58) Field of Classification Search .................. None
See application file for complete search history.

(56) References Cited

U.S. PATENT DOCUMENTS 3,519,325 A * 7/1970 Abel et al. ................. 359/210.1
2006/0256429 A1* 11/2006 Obrebski et al. ............. 359/380

\* cited by examiner

*Primary Examiner* — Derek S Chapel
(74) *Attorney, Agent, or Firm* — Alston & Bird LLP

(57) ABSTRACT

A telescope imaging system includes a first lens group for receiving a spot light and generating a first refracted beam, a second lens group for receiving the first refracted beam and generating a second refracted beam, a third lens group having a convex lens disposed at a side of the third lens group distant from the spot light for receiving the second refracted beam and generating a parallel beam by an effective focus formed by the first lens group, the second lens group and the third lens group, a first reflective mirror having an opening, receiving the parallel beam and generating a reflected beam, and a second reflective mirror adjacent to the third group lens and reflecting the reflected beam for allowing the reflected beam passing through the opening and focused as an image.

16 Claims, 3 Drawing Sheets

CATADIOPTRIC TELESCOPE IMAGING SYSTEM

FIELD OF THE INVENTION

The present invention relates to a telescope imaging system. More particularly, the present invention relates to a catadioptric telescope imaging system.

BACKGROUND OF THE INVENTION

Generally, the telescope imaging system is adopted and applied to investigating objects in a long distance for scientific applications including biological and astronomical observations. The telescope imaging system is mainly classified into a refractive telescope imaging system, a reflective telescope imaging system and a catadioptric telescope imaging system. For the refractive telescope system, there is a single convex lens accompanying an achromate and disposed at the front end of the observation tube thereof for the receipt and refraction of the parallel beam from the object in a long distant, the image of which is formed at the focus of the single convex lens, wherein the focus is located at a position between another convex lens and a focus thereof, wherein the another convex lens serves as an object lens and is located at the rear end of the observation tube. Accordingly, the image of the distant object is magnified and observed by the observer or an image recording device.

Currently, the Newtonian reflective telescope system dominates in the various types of the reflective telescope imaging system. The Newtonian reflective telescope system mainly comprises a secondary planar mirror and a primary concave reflective lens formed by a spherical surface or paraboloid surface coated with a reflective matter, wherein the secondary planar mirror is disposed before the focus of the primary concave reflective lens and inclines at an angle of 45 degrees at the front end of the observation tube corresponding to the longitudinal axis thereof. Accordingly, when the parallel beam from the object in the long distance enters the observation tube, the parallel beam passes through a pathway bending at a right angle after being reflected to the planar subordinate mirror by the primary concave reflective lens for being focused as an image outside of the observation tube.

A basic derivative of the catadioptric telescope imaging system is the Schmidt type, which basically comprises a primary spherical mirror and a correction lens in the observation tube thereof, so that the parallel beam from a distant object is first refracted by the correction lens and focused as an image by the primary spherical mirror thereafter. An advanced derivative of the catadioptric telescope imaging system is the Cassegrain type, which is distinguished from the Schmidt type in that the primary mirror further has an opening, so that the beam from the object is reflected to the subordinate mirror by the primary mirror and passes through the opening for being focused as an image at an rear end of the observation tube. Based on the abovementioned, the telescope imaging systems of the prior art is designed for the parallel beam of the object in the long distance, whereas they fail for a clear image of the spot light of the object in a short distance.

In order to overcome the drawbacks in the prior art, a catadioptric telescope imaging system is proposed through arduous experiments and research.

SUMMARY OF THE INVENTION

It is a first aspect of the present invention to provide an imaging system.

It is a second aspect of the present invention to provide a telescope imaging system.

It is a third aspect of the present invention to provide a telescope imaging system. The telescope imaging system comprises a first lens group for receiving a spot light and generating a first refracted beam, a second lens group for receiving the first refracted beam and generating a second refracted beam, a third lens group having a convex lens disposed at a side of the third lens group distant from the spot light for receiving the second refracted beam and generating a parallel beam by an effective focus formed by the first lens group, the second lens group and the third lens group, a first reflective mirror having an opening, receiving the parallel beam and generating a reflected beam and a second reflective mirror adjacent to the third group lens and reflecting the reflected beam for allowing the reflected beam passing through the opening and focused as an image.

Preferably, a distance between the first lens group and the second lens group is adjustable for forming the effective focus.

Preferably, a distance between the second lens group and the third lens group is adjustable for forming the effective focus.

Preferably, the first lens group has a positive refractive power.

Preferably, the second lens group has a negative refractive power.

Preferably, the third lens group has a positive refractive power.

Preferably, the first reflective mirror is an aspheric mirror for eliminating a coma aberration of the image.

Preferably, the second reflective mirror is a high-level aspheric mirror.

Preferably, at least one of the first lens group, the second lens group and the third lens group comprises a plurality of lenses.

It is a fourth aspect of the present invention to provide a telescope imaging system. The telescope imaging system comprises at least three lens groups forming an effective focus for receiving a spot light and generating a parallel beam, a first reflective mirror having an opening and reflecting the parallel beam as a reflective beam, and a second reflective mirror reflecting the reflective beam for allowing the reflective beam passing through the opening and focused as an image.

Preferably, the at least three lens have a convex lens disposed on a side of the at least three lens groups adjacent to the second reflective mirror.

Preferably, the second reflective mirror is a high-level aspheric mirror.

It is a fourth aspect of the present invention to provide a telescope imaging system. The telemicroscoping imaging system comprises a lens device receiving a spot light and generating a parallel beam, a reflective mirror set reflecting the parallel beam and allowing the parallel beam to be a reflected beam focused as an image and a charged coupled device coupled with the reflective mirror set for recording the image.

Preferably, the lens device includes a first lens group, a second lens group and a third lens group, and the reflective mirror set includes a first reflective mirror and a second reflective mirror, wherein the first lens group receives the spot light and generates a first refracted beam, the second lens group receives the first refracted beam and generates a second refracted beam, and the third lens group has a convex lens disposed at a side of the third lens group distant from the spot light for receiving the second refracted beam and generating the parallel beam by an effective focus formed by the first lens group, the second lens group, and the third lens group, wherein the reflective mirror set includes a first reflective mirror and a second reflective mirror, wherein the first reflective mirror has an opening and reflects the parallel beam as the reflected beam, and the second reflective mirror is adjacent to the third lens group and reflects the reflected beam for allowing the reflective beam passing through the opening and focused as an image, wherein the charged device is disposed at a side of the first reflective mirror distant from the second reflective mirror.

Preferably, a first distance between the first lens group and the second lens group is adjustable for forming the effective focus, wherein a second distance between the second lens group and the third lens group is adjustable for forming the effective focus.

Preferably, the first lens group has a positive refractive power.

Preferably, the second lens group has a negative refractive power.

Preferably, the third lens group has a positive refractive power.

Preferably, the first reflective mirror is an aspheric mirror for eliminating a coma aberration of the image.

Preferably, the second reflective mirror is a high-level aspheric mirror.

Other objects, advantages and efficacies of the present invention will be described in detail below taken from the preferred embodiments with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
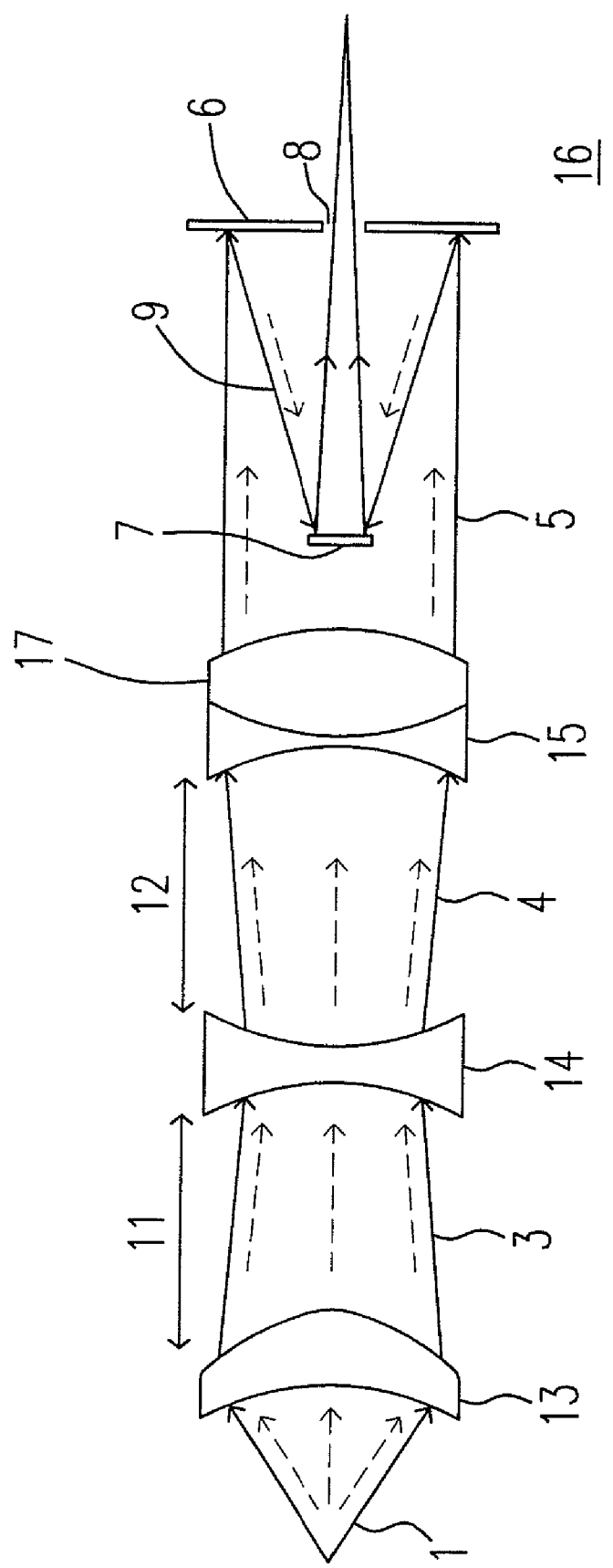
FIG. 1 is a diagram showing the catadioptric telescope imaging system according to a first preferred embodiment of the present invention.

Please refer to FIG. 1, which is a diagram showing a telescope imaging system according to a preferred embodiment of the present invention. The telescope imaging system 16 is applicable to observations in a short distance and comprises a first lens group 13, a second lens group 14, a third lens group 15, a first reflective mirror 6 and a second reflective mirror 7, wherein the first lens group 13, the second lens group 14 and the third lens group 15 form an effective focus and the first reflective mirror 6 includes an opening 8. Moreover, for an observer intending to investigate an object in the short distance and obtain an image thereof through a spot light 1, the telescope imaging system 16 is specifically designed in this way that there are also a first adjustable distance 11 between the first lens group 13 and the second lens group 14 and a second adjustable distance 12 between the second lens group 14 and the third lens group 15 for adjusting and forming the effective focus, so that the spot light 1 manages to be received by the first lens group 13 to provide a first refracted beam 3.

Sequentially, the first refracted beam 3 is received by the second lens group 14 to form a second refracted beam 4, which is then received by the third lens group 15 to generate a parallel beam 5. After the optical effect from the third lens group 15, the parallel beam 5 is then reflected by the first reflective mirror 6 as a reflected beam 9, wherein the second reflective mirror 7 again reflects the reflected beam 9, so that the reflected beam 9 is allowed to pass through the opening 8 to be focused as the image. Accordingly, the image manages to be observed at a side of the first reflective mirror 6 distant from the second reflective mirror 7, wherein there is an advantage resulting therefrom that the observation tube of the telescope imaging system 16 is reducible owing to the second reflection by the second reflective mirror 7 before the reflected beam 9 is focused to form the image.

To obtain a clear observation on the image for the observer from the spot light 1 through the effective focus, it is preferably that an aspheric mirror is adopted for the first reflective mirror 6 and a high-level aspheric mirror is adopted for the second reflective mirror 7 so as to eliminate a coma aberration of the image. Correspondingly, the first lens group 13 is designed to have an optical property of a positive refractive power, the second lens group 14 has the optical property of a negative refractive property and the third lens group 15 has the optical property of a positive refractive power, wherein a constitution of a plurality of lens is also practicable to the first lens group 13, the second lens group 14 and the third lens group 15 to achieve necessary parameters of the related optical properties. Particularly, a convex lens 17 is disposed at a side of the third lens group 15 distant from the spot light 1 and adjacent to the second reflective mirror 7 to provide the parallel beam 5, which is reflected by the first reflective mirror 6 as the reflected beam 9 to be focused.

Figure 2:
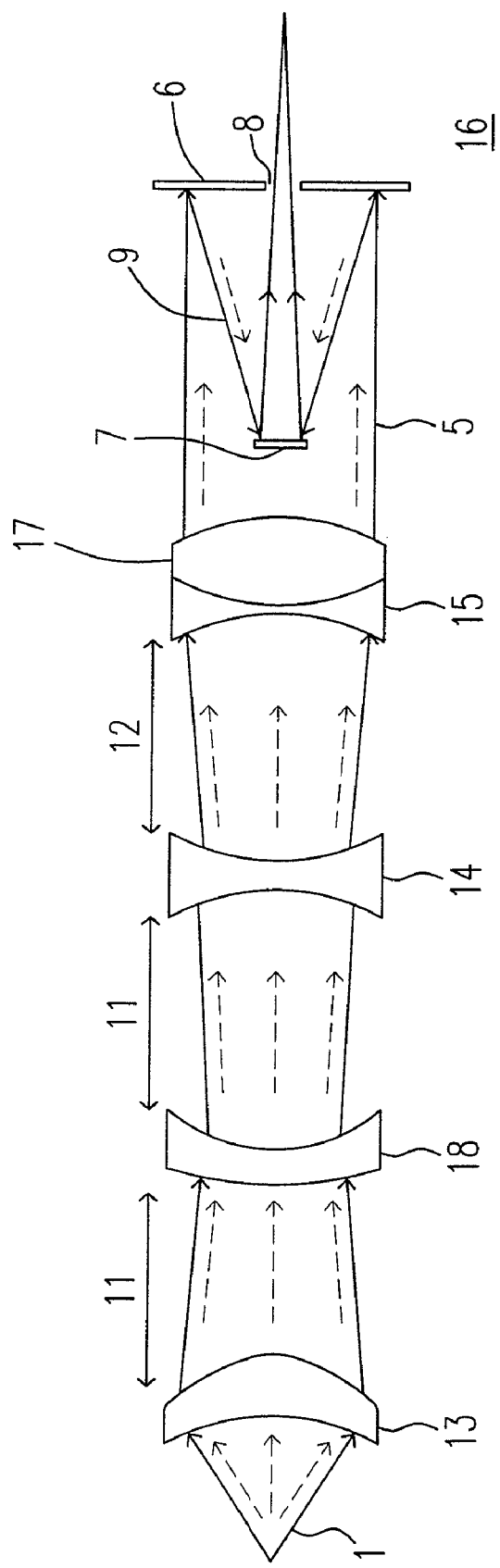
FIG. 2 is a diagram showing the catadioptric telescope imaging system according to a second preferred embodiment of the present invention.

Please refer to FIG. 2, which is a diagram showing a telescope imaging system according to a preferred embodiment of the present invention. The telescope imaging system 16 is applicable to observations in a short distance and comprises a first lens group 13, a second lens group 14, a third lens group 15, a first reflective mirror 6 and a second reflective mirror 7, wherein the first reflective mirror 6 has an opening 8, a fourth lens group 18 with a negative refractive power is disposed between the first lens group 13 and the second lens group 14 so that an effective focus formed by the four lens groups is substantively increased to provide a higher magnification ratio for the image for the observer.

Moreover, for an observer intending to investigate an object in the short distance and obtain an image thereof through a spot light 1, the telescope imaging system 16 is specifically designed in this way that there are also two first adjustable distances 11, one being between the first lens group 13 and the fourth lens group 18, the other being between the second lens group 14 and the fourth lens group 18, and a second adjustable distance 12 between the second lens group 14 and the third lens group 15 for adjusting and forming the effective focus, so that the spot light 1 is received by the four lens groups to provide a parallel beam 5, which is then reflected to the second reflective mirror 7 as a reflected beam 9 by the first reflective mirror 6. Sequentially, the reflected beam 9 is again reflected by the second reflective mirror 7 and passes through the opening hole 8 of the first reflective mirror 6 to be focused as the image at a side of first reflective mirror 6 distant from the second reflective mirror 7. In addition, the observation tube of the telescope imaging system 16 is further reducible owing to a second reflection by the second reflective mirror 7 before the image is formed by the reflected beam 9.

To obtain a clear observation on the image for the observer from the spot light 1 through the effective focus, it is preferably that an aspheric mirror is adopted for the first reflective mirror 6 and a high-level aspheric mirror is adopted for the second reflective mirror 7 so as to eliminate a coma aberration of the image. Correspondingly, the first lens group 13 is designed to have an optical property of a positive refractive power, the second lens group 14 has the optical property of a negative refractive property and the third lens group 15 has the optical property of a positive refractive power, wherein a convex lens 17 is particularly disposed at a side of the third lens group 15 distant from the spot light 1 and adjacent to the second reflective mirror 7 to provide the parallel beam 5, which is reflected by the first reflective mirror 6.

Figure 3:
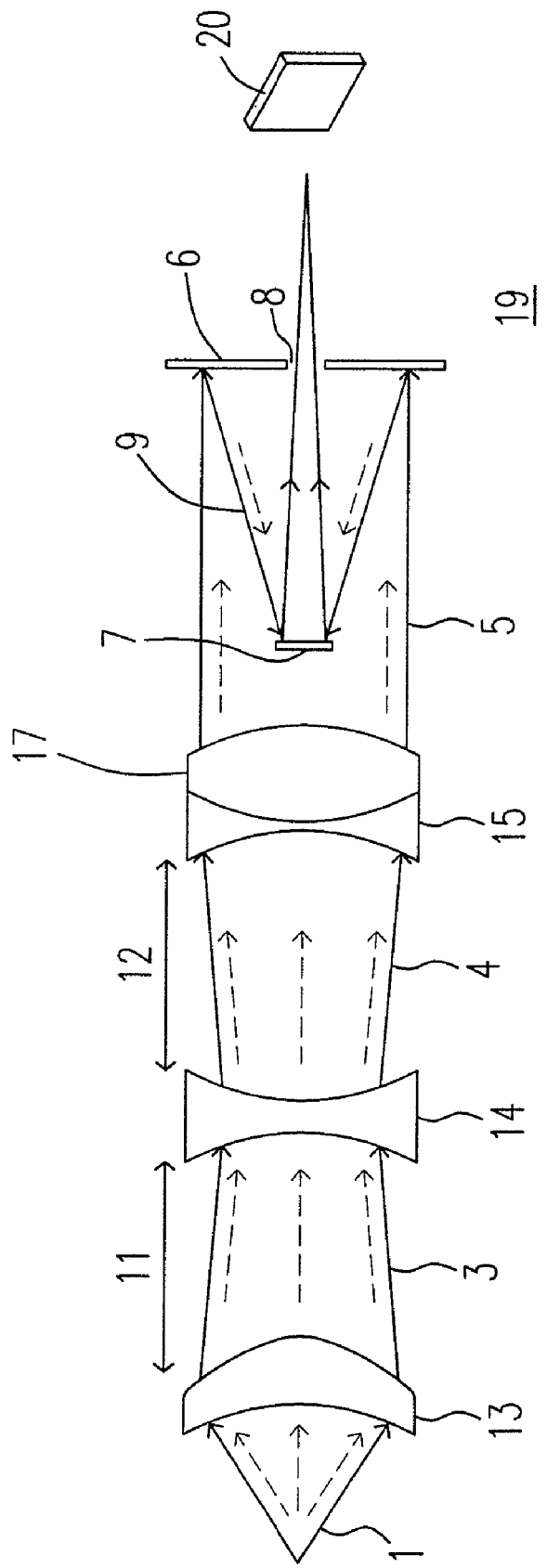
FIG. 3 is a diagram showing the catadioptric telescope imaging system according to a third preferred embodiment of the present invention according to a third preferred embodiment of the present invention.

Please refer to FIG. 3, which is a diagram showing a catadioptric telescope image recording system according to a preferred embodiment of the present invention. The catadioptric telescope image recording system 19 comprises a first lens group 13, a second lens group 14, a third lens group 15, a first reflective mirror 6 with an opening 8, a second reflective mirror 7 and a charged coupled device 20 coupled with a side of the first reflective mirror 6 distant from the second reflective mirror 7, wherein the first lens group 13, the second lens group 14 and the third lens group 15 form an effective focus.

Moreover, for an observer intending to observe an object in the short distance and obtain an image thereof through a spot light 1, the catadioptric telescope image recording system 19 is specifically designed in this way that there are a first adjustable distance 11 and a second adjustable distance 12 for adjusting the effective focus, so that a parallel beam 5 is provided by the spot light 1 through the refraction effects of the three lens groups, wherein the parallel beam 5 is reflected to the second reflective mirror 7 as a reflected beam 9 by the first reflective mirror 6. Sequentially, the reflected beam 9 is again reflected by the second reflective mirror 7 and passes through the opening 8 of the first reflective mirror 6 to be focused and form the image at a side of the first reflective mirror 6 distant from the second reflective mirror 7. Accordingly, it is achievable that the image is recorded by the charged coupled device 20.

To obtain a clear observation on the image for the observer from the spot light 1 through the effective focus, it is preferably that an aspheric mirror is adopted for the first reflective mirror 6 and a high-level aspheric mirror is adopted for the second reflective mirror 7 so as to eliminate a coma aberration of the image. Correspondingly, the first lens group 13 is designed to have an optical property of a positive refractive power, the second lens group 14 has the optical property of a negative refractive property and the third lens group 15 has the optical property of a positive refractive power, wherein a constitution of a plurality of lens is also practicable to the first lens group 13, the second lens group 14 and the third lens group 15 to achieve necessary parameters of the related optical properties. Particularly, a convex lens 17 is disposed at a side of the third lens group 15 distant from the spot light 1 and adjacent to the second reflective mirror 7 to provide the parallel beam 5, which is reflected by the first reflective mirror 6.

To summarize, the present invention proposes a telescope imaging system, which comprises a first lens group, a second lens group, a third lens group, a first reflective mirror and a second reflective mirror so that an observer manages to obtain a clear image of an object in the short distance through a spot light. Therefore, the drawback of the prior art where the imaging system fails to obtain the image of the object in a short distance is overcome. Thus, the present invention not only bears novelty and obviously progressive nature, but also bears the utility for the industry.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar embodiments.

What is claimed is:

1. A telescope imaging system, comprising:
    a first lens group for receiving a spot light and generating a first refracted beam;
    a second lens group for receiving the first refracted beam and generating a second refracted beam;
    a third lens group having a convex lens disposed at a side of the third lens group distant from the spot light for receiving the second refracted beam and generating a parallel beam by an effective focus formed by the first lens group, the second lens group and the third lens group;
    a first reflective mirror having an opening, receiving the parallel beam and generating a reflected beam; and
    a second reflective mirror adjacent to the third lens group, reflecting the reflected beam, and allowing the reflected beam to pass through the opening and be focused as an image, wherein a first distance between the first lens group and the second lens group is adjustable for forming the effective focus, and a second distance between the second lens group and the third lens group is adjustable for forming the effective focus.

2. A system as claimed in claim 1, wherein the first lens group has a positive refractive power.

3. A system as claimed in claim 1, wherein the second lens group has a negative refractive power.

4. A system as claimed in claim 1, wherein the third lens group has a positive refractive power.

5. A system as claimed in claim 1, wherein the first reflective mirror is an aspheric mirror for eliminating a coma aberration of the image.

6. A system as claimed in claim 1, wherein the second reflective mirror is a high-level aspheric mirror.

7. A system as claimed in claim 1, wherein at least one of the first lens group, the second lens group and the third lens group comprises a plurality of lenses.

8. A telescope imaging system, comprising:
    at least three lens groups including a first, a second and a third lens groups, and forming an effective focus for receiving a spot light and generating a parallel beam;
    a first reflective mirror having an opening and reflecting the parallel beam as a reflected beam; and
    a second reflective mirror reflecting the reflective beam, and allowing the reflected beam to pass through the opening and be focused as an image, wherein a first distance between the first lens group and the second lens group is adjustable for forming the effective focus, and a second distance between the second lens group and the third lens group is adjustable for forming the effective focus.

9. A system as claimed in claim 8, wherein the at least three lens groups have a convex lens disposed on a side of the at least three lens groups adjacent to the second reflective mirror.

10. A system as claimed in claim 8, wherein the second reflective mirror is a high-level aspheric mirror.

11. A catadioptric telescope imaging system, comprising:
a lens device receiving a spot light and generating a parallel beam;
a reflective mirror set reflecting the parallel beam and allowing the parallel beam to be reflected and focused as an image; and
a charged coupled device coupled with the reflective mirror set for recording the image,
wherein the lens device includes a first lens group, a second lens group and a third lens group, and the reflective mirror set includes a first reflective mirror and a second reflective mirror, wherein the first lens group receives the spot light and generates a first refracted beam, the second lens group receives the first refracted beam and generates a second refracted beam, and the third lens group has a convex lens disposed at a side of the third lens group distant from the spot light for receiving the second refracted beam and generating the parallel beam by an effective focus formed by the first lens group, the second lens group, and the third lens group, wherein the first reflective mirror has an opening and reflects the parallel beam as the reflected beam, and the second reflective mirror is adjacent to the third lens group, reflects the reflected beam, and allows the reflective beam to pass through the opening and be focused as an image, wherein the charged device is disposed at a side of the first reflective mirror distant from the second reflective mirror, wherein a first distance between the first lens group and the second lens group is adjustable for forming the effective focus, and a second distance between the second lens group and the third lens group is adjustable for forming the effective focus.

12. A system as claimed in claim 11, wherein the first lens group has a positive refractive power.

13. A system as claimed in claim 11, wherein the second lens group has a negative refractive power.

14. A system as claimed in claim 11, wherein the third lens group has a positive refractive power.

15. A system as claimed in claim 11, wherein the first reflective mirror is an aspheric mirror for eliminating a coma aberration of the image.

16. A system as claimed in claim 11, wherein the second reflective mirror is a high-level aspheric mirror.

* * * * *